(12) United States Patent
Natanzon

(10) Patent No.: US 10,042,579 B1
(45) Date of Patent: Aug. 7, 2018

(54) CRASH CONSISTENT SNAPSHOT

(71) Applicant: EMC Corporation, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 673 days.

(21) Appl. No.: 14/035,118

(22) Filed: Sep. 24, 2013

(51) Int. Cl.
 *G06F 12/00* (2006.01)
 *G06F 3/06* (2006.01)

(52) U.S. Cl.
 CPC ............ *G06F 3/065* (2013.01); *G06F 3/0619* (2013.01); *G06F 3/0689* (2013.01)

(58) Field of Classification Search
 CPC ........ G06F 3/065; G06F 3/067; G06F 3/0605; G06F 3/0641; G06F 3/0619; G06F 3/0689; G06F 3/0665; G06F 11/2071; G06F 11/2064; G06F 11/1076; G06F 11/2069; G06F 17/30088
 See application file for complete search history.

(56) References Cited

U.S. PATENT DOCUMENTS

| | | | | |
|---|---|---|---|---|
| 7,178,055 | B2* | 2/2007 | Ji | G06F 11/2069 711/162 |
| 7,421,549 | B2* | 9/2008 | Watanabe | G06F 11/2064 707/999.202 |
| 7,624,109 | B2* | 11/2009 | Testardi | G06F 11/1471 |
| 7,984,254 | B2* | 7/2011 | Karamanolis | G06F 11/1458 711/162 |
| 8,190,571 | B2* | 5/2012 | Sen | G06F 11/1448 707/609 |
| 8,214,612 | B1* | 7/2012 | Natanzon | G06F 11/1612 707/622 |
| 8,250,033 | B1* | 8/2012 | De Souter | G06F 17/30088 707/637 |
| 8,271,441 | B1* | 9/2012 | Natanzon | G06F 11/1471 707/634 |
| 8,335,771 | B1* | 12/2012 | Natanzon | G06F 17/30008 707/684 |
| 8,521,694 | B1* | 8/2013 | Natanzon | G06F 17/30017 707/649 |
| 8,600,945 | B1* | 12/2013 | Natanzon | G06F 17/00 707/648 |
| 8,706,700 | B1* | 4/2014 | Natanzon | G06F 17/30088 707/609 |

(Continued)

OTHER PUBLICATIONS

"Replicating Oracle with RecoverPoint", EMC Technical Notes, Jul. 11, 2010.*

(Continued)

*Primary Examiner* — Matthew Bradley
*Assistant Examiner* — Francisco A Grullon
(74) *Attorney, Agent, or Firm* — Krishnendu Gupta; Robert Kevin Perkins

(57) ABSTRACT

A method, system, and computer program product for splitting IOs directed to a first LUN and a second LUN to a journal on a replication site, creating a snapshot of the first LUN, creating a snapshot of the second LUN, and applying the IO in the journal on the replication site to a copy of the snapshot of the first LUN on the replication site and a copy of the snapshot of the second LUN on the replication site to create a consistent snapshot of the first LUN and the second LUN on the replication site.

15 Claims, 12 Drawing Sheets

(56) References Cited

U.S. PATENT DOCUMENTS

| | | | |
|---|---|---|---|
| 9,189,341 B1* | 11/2015 | Natanzon | G06F 3/065 |
| 2008/0086608 A1* | 4/2008 | Kano | G06F 3/0607 |
| | | | 711/162 |
| 2008/0209146 A1* | 8/2008 | Imazu | G06F 11/2074 |
| | | | 711/162 |
| 2008/0243952 A1* | 10/2008 | Webman | G06F 11/2097 |
| 2011/0010515 A1* | 1/2011 | Ranade | G06F 11/1451 |
| | | | 711/162 |
| 2011/0119460 A1* | 5/2011 | Wankhade | G06F 17/30088 |
| | | | 711/164 |
| 2012/0324183 A1* | 12/2012 | Chiruvolu | G06F 11/2038 |
| | | | 711/162 |
| 2014/0059300 A1* | 2/2014 | Olin | G06F 12/16 |
| | | | 711/142 |
| 2014/0244952 A1* | 8/2014 | Raj | G06F 11/1448 |
| | | | 711/162 |

OTHER PUBLICATIONS

"Using EMC Recoverpoint Concurrent Local and Remote for Operational and Disaster Recovery", EMC, May 2012.*
"EMC Replication Manager and EMC Recoverpoint", EMC, Apr. 2012.*
"Cisco MDS 9000 SANTap", Cisco, Jan. 4, 2010.*
"EMC World 2012—The New VMAX—Part 2RecoverPoint Splitter" Itzik Blog, May 21, 2012.*
"Configure VM Snapshots for Crash-Consistent Quiescing with PowerCL1." #vBrownBag. https://vbrownbag.com/2012/12/configure-vm-snapshots-for-crash-consistent-quiescing-with-powercli/. Dec. 14, 2012.*

* cited by examiner

CRASH CONSISTENT SNAPSHOT

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and computer program product for splitting IOs directed to a first LUN and a second LUN to a journal on a replication site, creating a snapshot of the first LUN, creating a snapshot of the second LUN, and applying the IO in the journal on the replication site to a copy of the snapshot of the first LUN on the replication site and a copy of the snapshot of the second LUN on the replication site to create a consistent snapshot of the first LUN and the second LUN on the replication site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
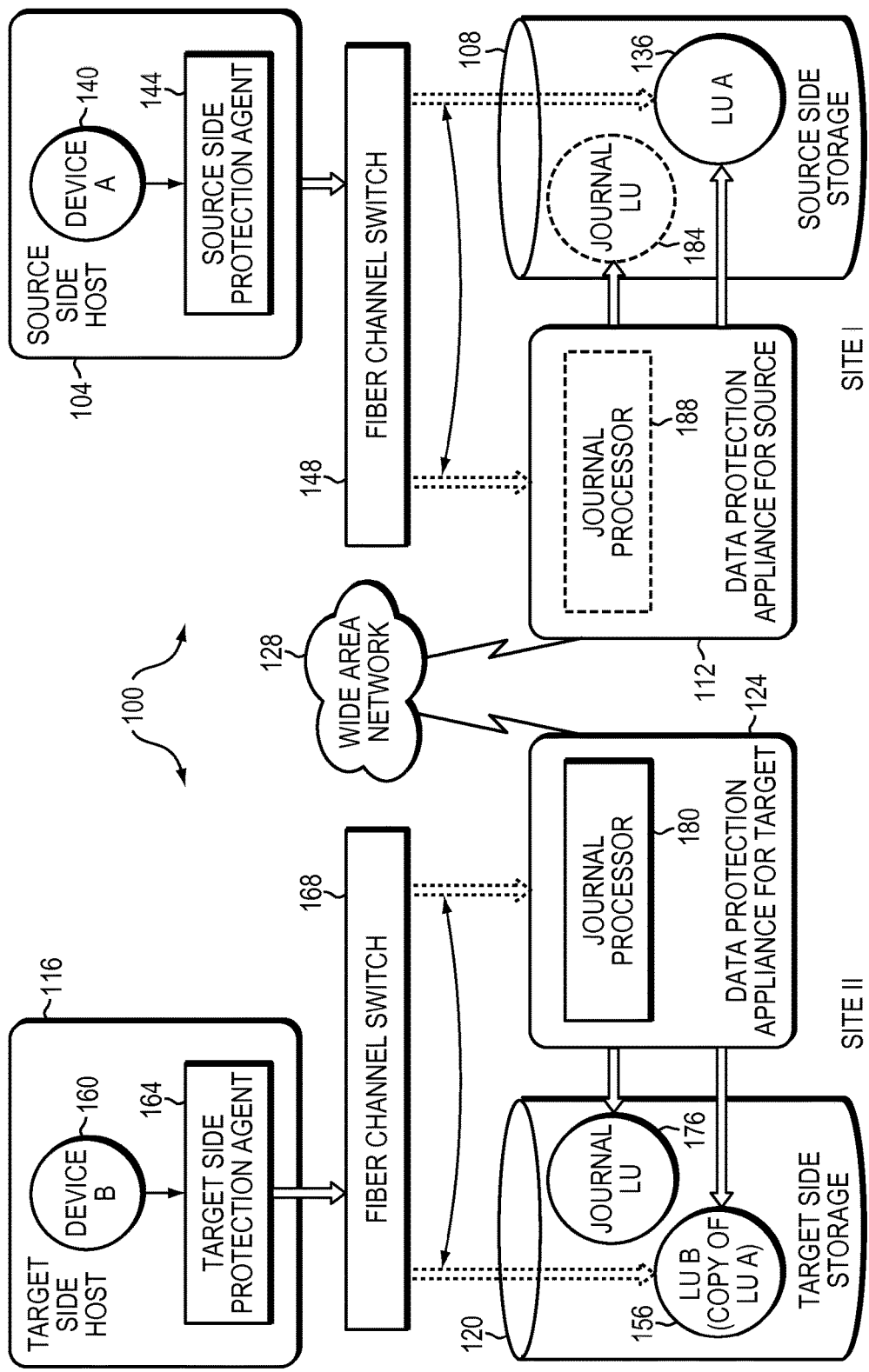
FIG. 1 is a simplified illustration of a data protection system, in accordance with an embodiment of the present disclosure.

Typically, it may be problematic to take a snapshot of a consistency group when the consistency group spans multiple arrays. Generally, there may not be a way to ensure that a snapshot taken on a first array is crash consistent with a snapshot taken on a second array. Usually, this may occur as the two snapshots may not be synchronized.

In particular embodiments, the current disclosure may enable crash consistent snapshots to be taken across multiple arrays. In at least some embodiments, the storage arrays may be of different types, such as EMC®'s Symmetrix® and EMC's Clariion® storage arrays. In other embodiments, the current disclosure may use journaling to enable taking snapshots at the same point of time across multiple storage arrays. In further embodiments, a journal of IO written to a consistency group spanning different arrays may be recorded. In some embodiments, the journal may be constructed through the use of one or more splitters on each array to split the IO to a DPA which splits the IO to a journal. In certain embodiments, snapshots of LUNs in a consistency group may be taken during splitting of IO to a consistency group. In at least some embodiments, differences between a snapshot taken during splitting and a previous snapshot may be calculated. In certain embodiments, differences between snapshots may be sent to a replication site. In other embodiments, a replication site may apply the changes to the snapshots to a replication snapshot. In further embodiments, IO recorded in a journal may be applied to snapshots on the replication site to create a crash consistent snapshot.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage Virtualization filter appliance (VFA): may be a layer in the hypervisor that has the ability intercepts and split IO from a VM being written to a virtual disk. In some embodiments, the VFA may be running on a VM in a hypervisor
This is an out of mechanism that allows storage management over web based APIs.

VVOL-filter—may be a VM utilizing a specialized Virtual machine, which may provide an infrastructure that allows for introducing a "device driver" into the virtualized IO stack provided by the Virtual machine Virtual RPA (vRPA)/Virtual DPA (vDPA): may be an DPA running in a VM.

VASA may be vSphere Storage application program interfaces (APIs) for Storage Awareness.

DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332, 687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341, 115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
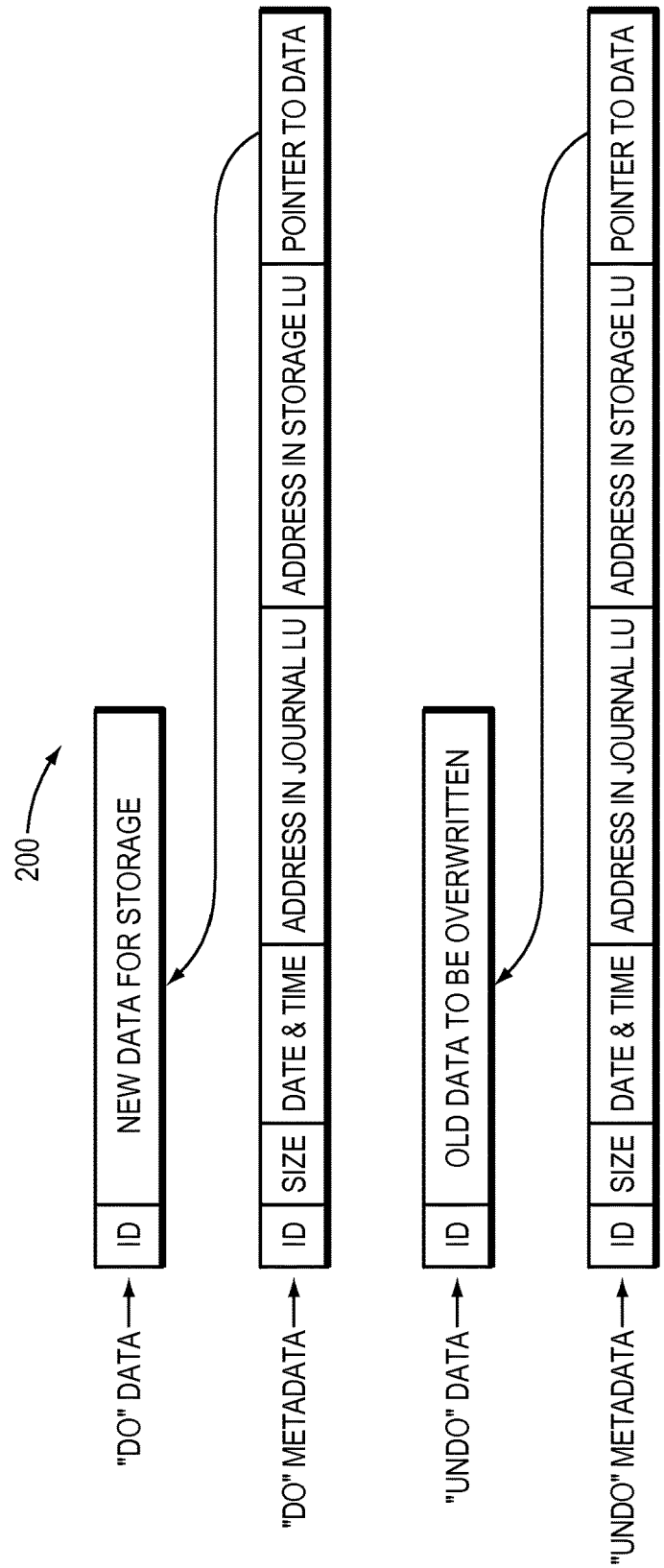
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Consistent Snapshots

Figure 3:
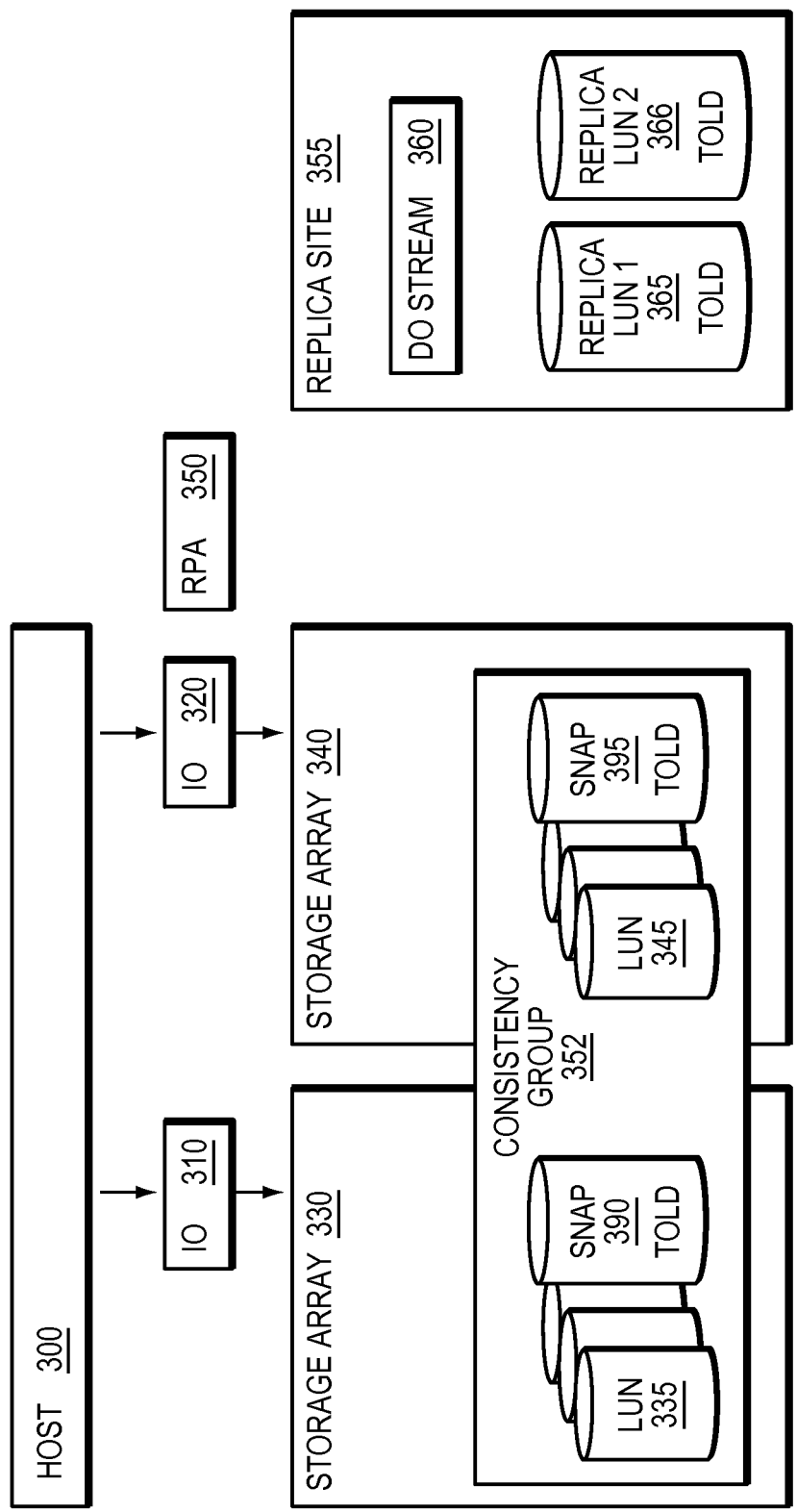
FIG. 3 is a simplified illustration of a data protection system with a consistency group spanning two arrays, in accordance with an embodiment of the present disclosure.

Refer now to the example embodiment of FIG. 3. In this example embodiment Host 300 sends IOs 310 and 320 to storage array 330 and storage array 340. IOs 310 and 320 are directed to LUNs 335 and 345 which are part of consistency group 352. Storage array 330 has a snapshot 390 at time T_old and storage array 340 has snapshot 395 at time T_old. Replication site 355 has replica LUN 365 of LUN 335 and replica 366 of LUN 345 which has data identical to snap 390 and snap 395. In certain embodiments, the data from the production site may have been transferred to the replica site by a snapshot shipping mechanism. In certain embodiments, snapshots on a production site, such as snapshots 390 and 395, may not be consistent with one another. Replication site also has DO stream 360. Replication appliance 350 is also illustrated in FIG. 3. The embodiment of FIG. 3 may be configured to create replica point in time copies of the production LUNs which are crash consistent between the two arrays.

Figure 4:
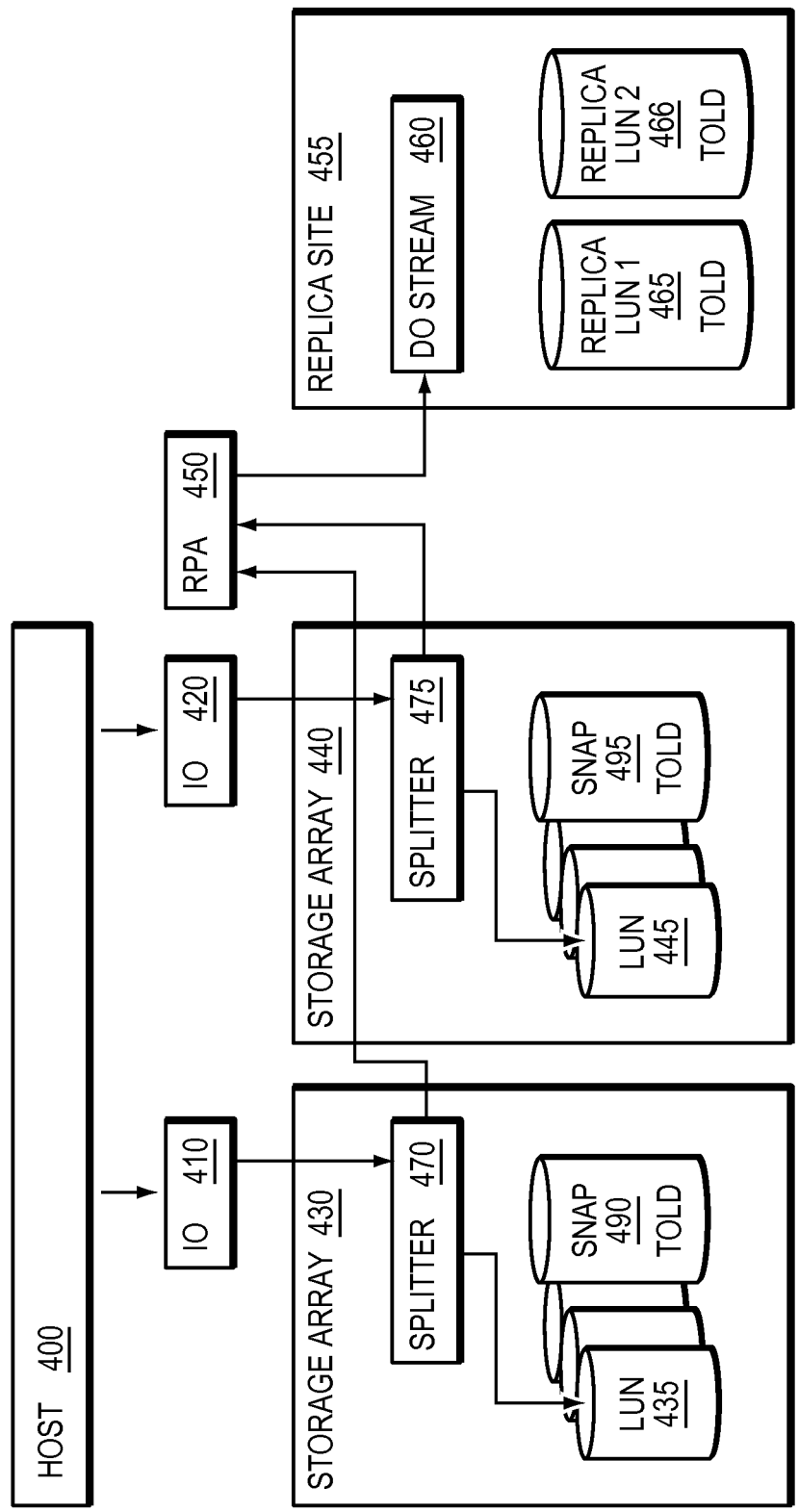
FIG. 4 is a simplified illustration of a splitting IO from a consistency group spanning two arrays, in accordance with an embodiment of the present disclosure.
Figure 9:
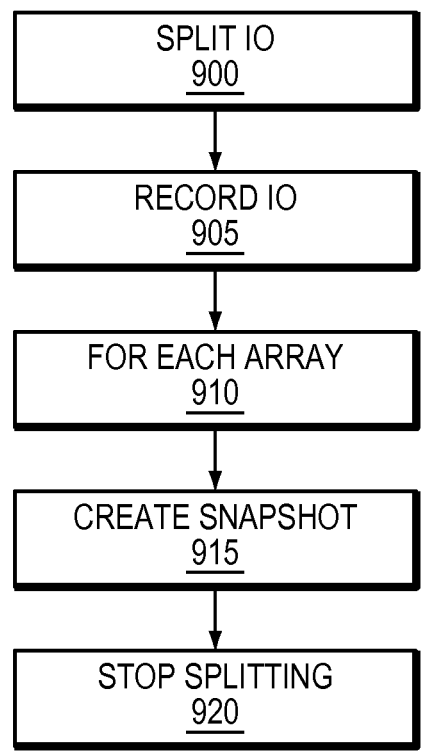
FIG. 9 is a simplified example of a method for recording changes to LUNs during taking of snapshot, in accordance with an embodiment of the present disclosure.

Refer now to the example embodiments of FIGS. 4 and 9. In FIG. 4, storage array 430 has splitter 470. Storage array 440 has splitter 475. To create a snapshot consistent across arrays 330, 340, Splitter 470 is configured to intercept IO 410 from host 400 before IO 410 is written to LUN 435. Splitter 470 splits IO 410 to RPA 450 (step 900). Splitter 475 is configured to split IO 420 to RPA 450 (step 900). RPA 450 sends the split IO to DO stream 460 on replication site 455 (step 910). In most embodiments, splitting IO may be making a copy of the IO before the IO is passed to a LUN for that IO.

Figure 5:
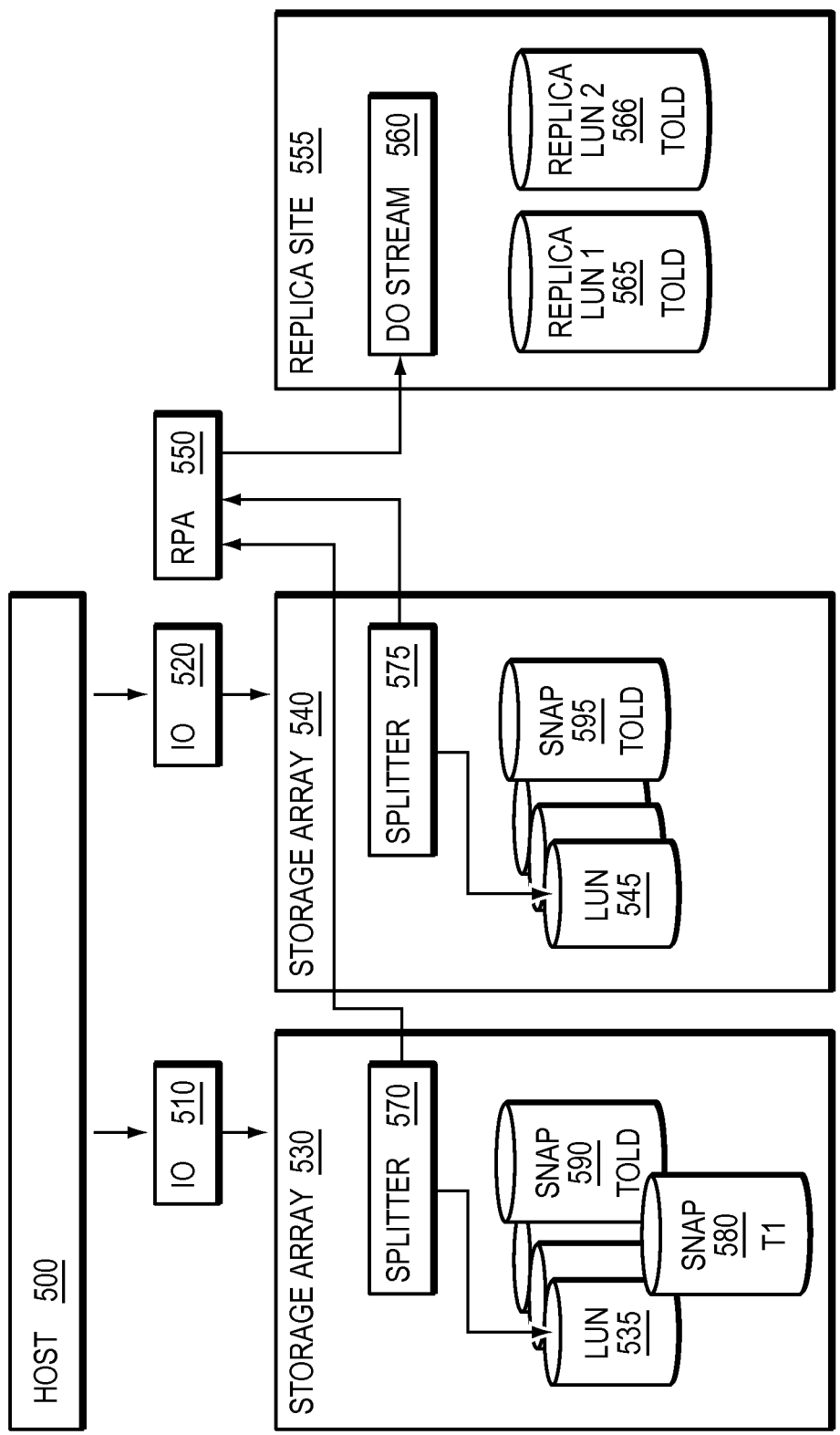
FIG. 5 is a simplified illustration of taking a first snapshot while a splitting IO from a consistency group spanning two arrays, in accordance with an embodiment of the present disclosure.

Refer now to the example embodiments of FIGS. 5 and 9. In these embodiments, storage array 530 takes snapshot 580 of LUN 535 at time T1 (steps 910, 915). IOs 510 and 520 are being split by splitters 570 and 575, respectively, to RPA 550, which is recording the IO in DO stream 560 on replication site 555.

Figure 6:
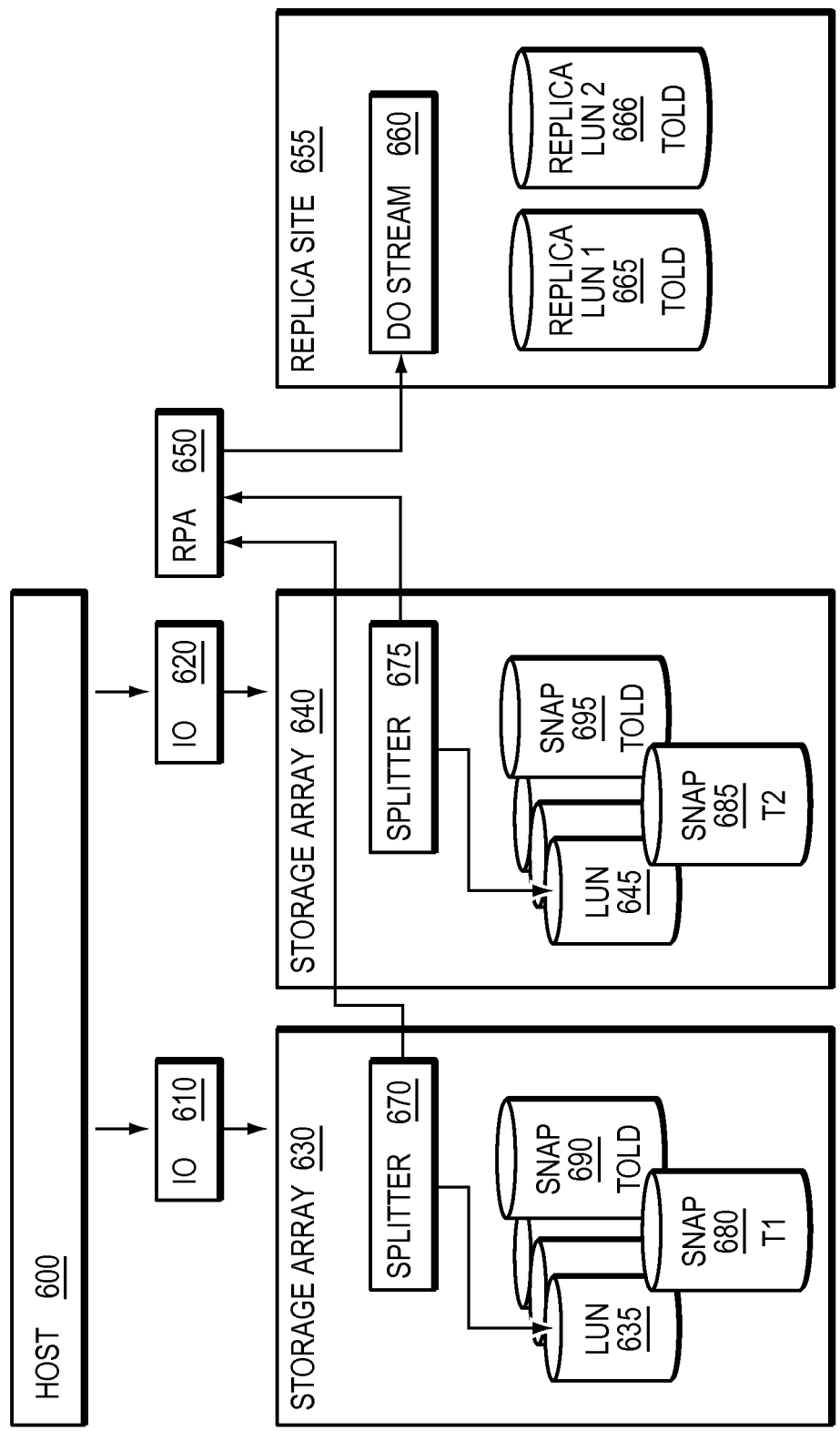
FIG. 6 is a simplified illustration of taking a second snapshot while a splitting IO from a consistency group spanning two arrays, in accordance with an embodiment of the present disclosure.

Refer now to the example embodiments of FIGS. 6 and 9. In these embodiments, storage array 640 takes snapshot 685 of LUN 645 at time T2 (steps 910, 915). IOs 610 and 620 are being split by splitters 670 and 675, respectively, to RPA 650, which is recording the IO in DO stream 660 on replication site 655. Splitters 670 and 675 stop splitting IO (step 920).

Figure 7:
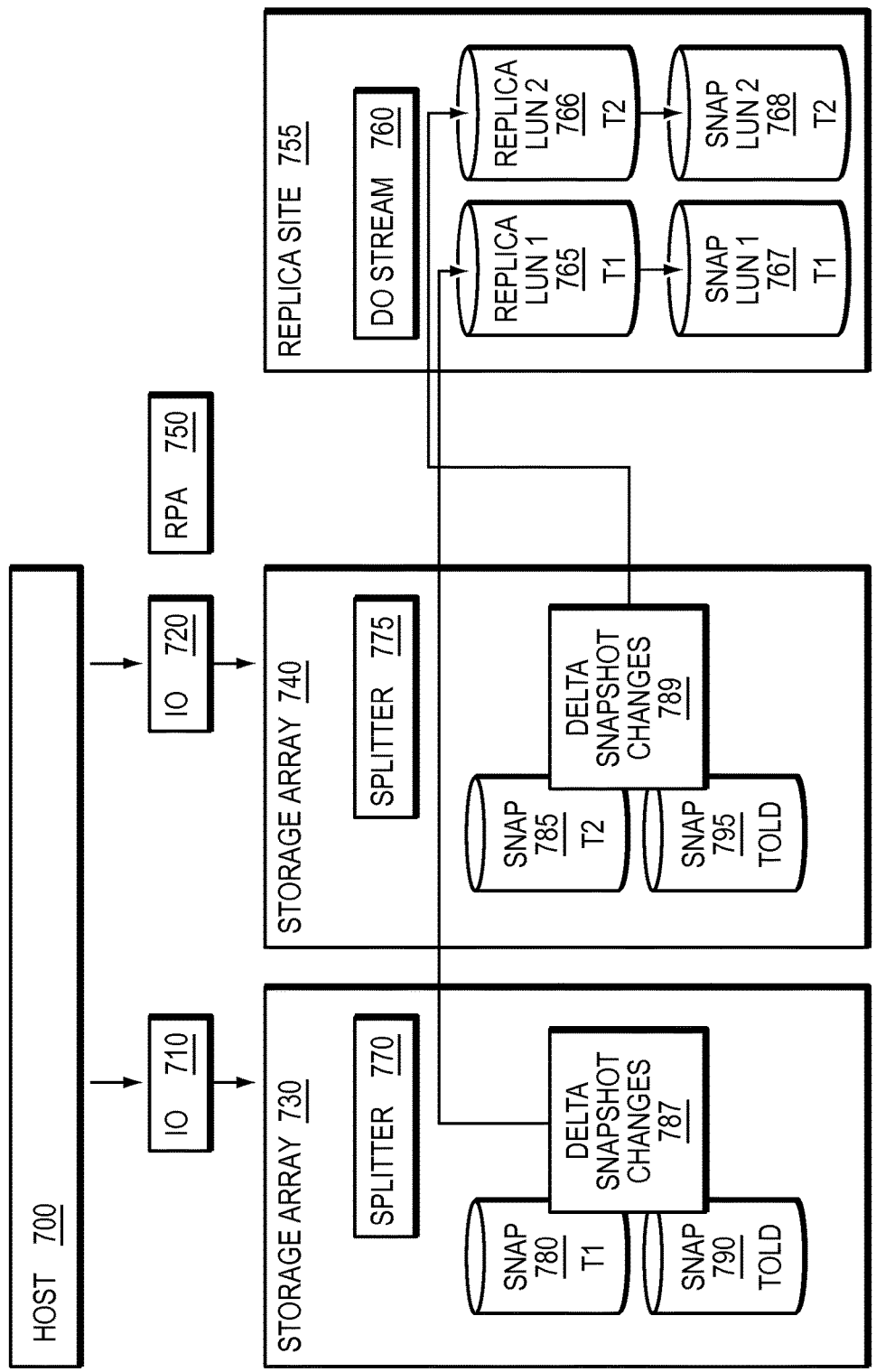
FIG. 7 is a simplified illustration of determining the differences between two snapshots of a consistency group spanning two arrays, in accordance with an embodiment of the present disclosure.
Figure 10:
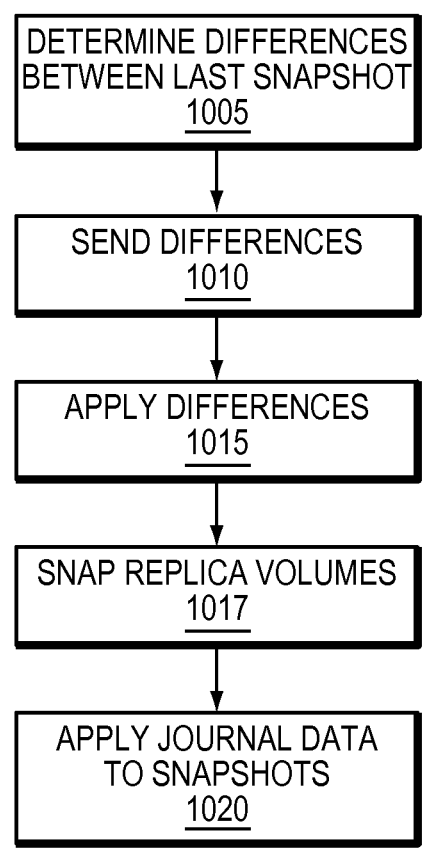
FIG. 10 is a simplified example of a method for applying recording changes to LUNs to create consistent snapshots, in accordance with an embodiment of the present disclosure.

Refer now to the example embodiments of FIGS. 7 and 10. In these example embodiments, the differences between snapshot 780 at time T1 and snapshot 790 at Told are determined (step 1005). The differences between snapshot 785 at time T2 and snapshot 795 at Told are determined (step 1005). Delta snapshot changes 787 from storage array 730 and delta snapshot changes 789 from storage array 740 are sent to replication site 755 (step 1010). The Delta snapshots are applied to replica 765 at Told and replica volume 766 at Told (step 1015). In most embodiments applying the changes to the snapshot at the replication site may make the data at the replication site equivalent to the snapshot on the storage arrays. A snapshot is created (1017) of replica LU 765 as SNAP 767 and replica LU 766 as SNAP 768.

Figure 8:
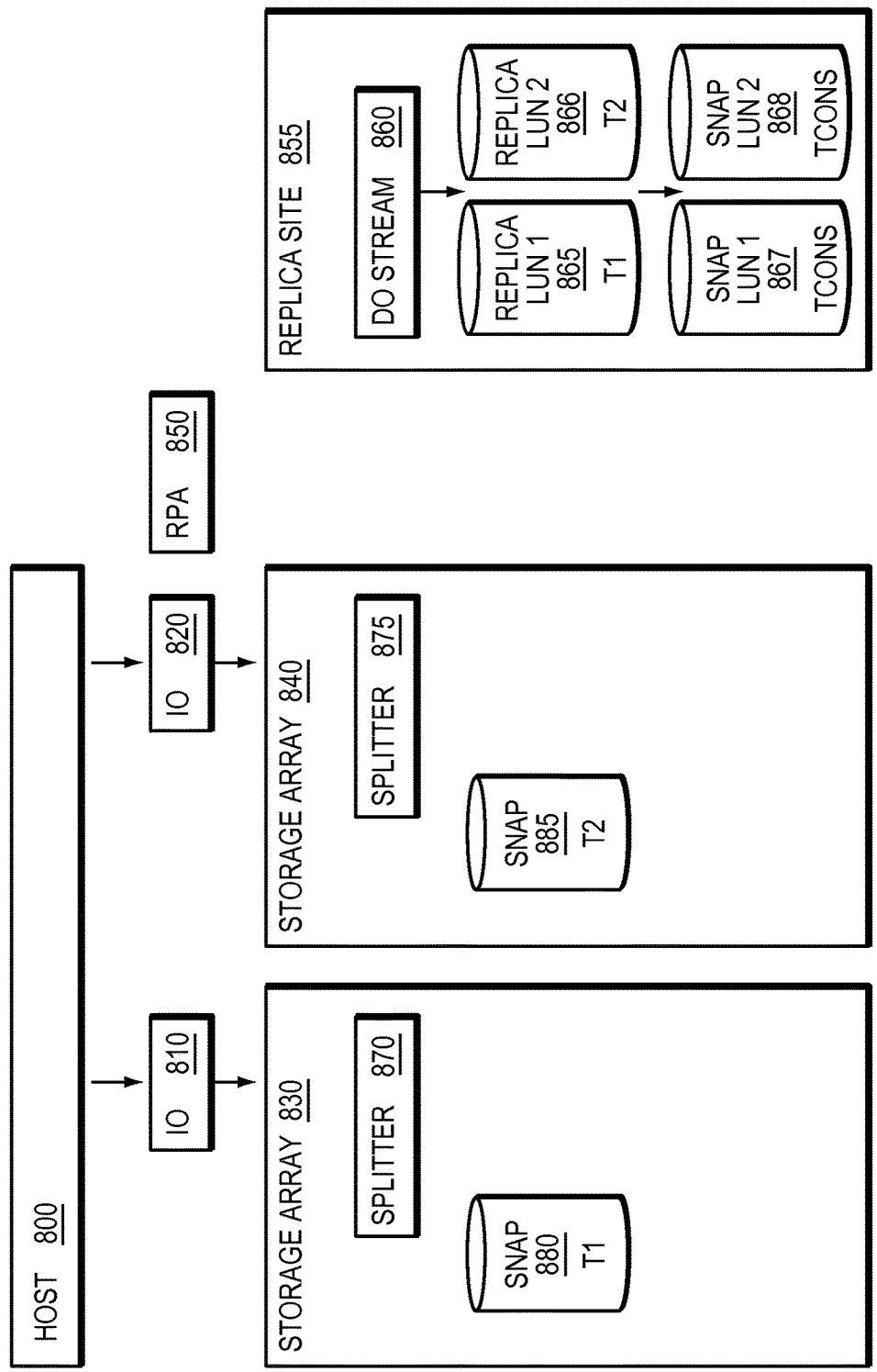
FIG. 8 is a simplified illustration of applying IO journal to two snapshots on a replication site corresponding to a consistency group spanning two arrays to create consistent snapshots on the replication site, in accordance with an embodiment of the present disclosure.

Refer now to the example embodiments of FIGS. 8 and 10. In the example embodiments of FIGS. 8 and 10, IO in DO Stream 860 is applied to Snap 867 and Snap 868 at replica site to bring Snap 866 to be Snap 868 at time Tconsistent and Snap 868 to be at time Tconsistent. In most embodiments, applying the IO tracked in the DO journal and the changes between the old snapshot and the snapshot taken while the system was journaling IO changes, may result in a crash consistent snapshot at the replication site.

Figure 11:
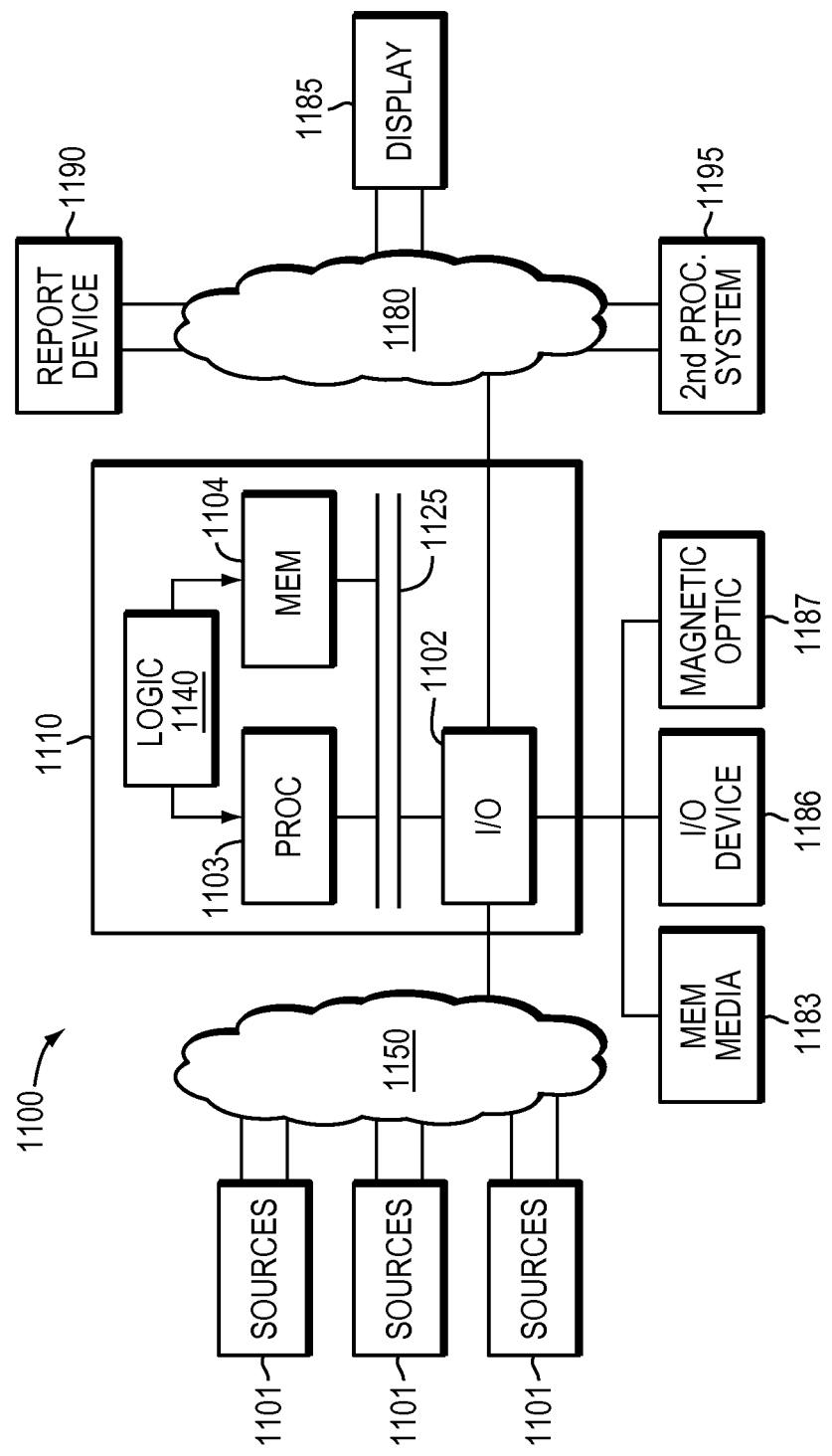
FIG. 11 is an example of an embodiment of an apparatus that may utilize the techniques described herein, in accordance with an embodiment of the present disclosure.
Figure 12:
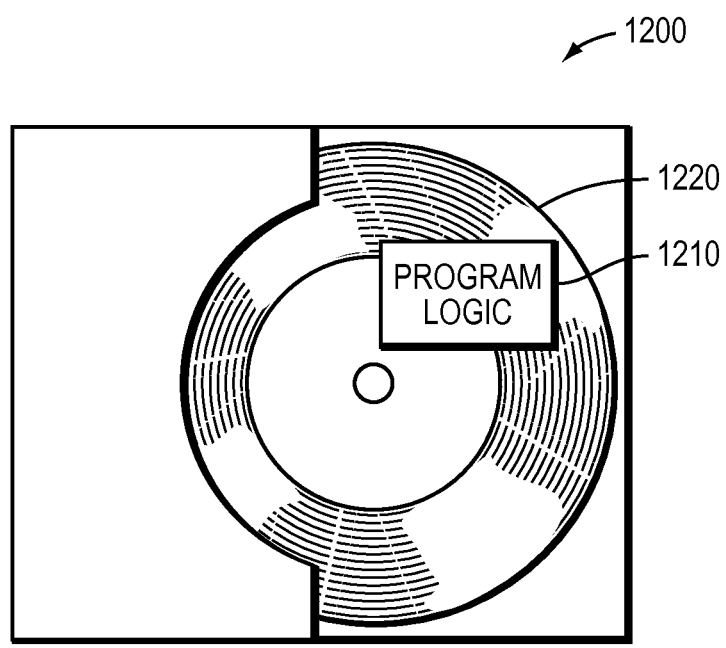
FIG. 12 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor 1103 to provide a unique apparatus that operates analogously to specific logic circuits. As such a general purpose digital machine can be transformed into a special purpose digital machine. FIG. 12 shows Program Logic 1234 embodied on a computer-readable medium 1230 as shown, and wherein the Logic is encoded in computer-executable code configured for carrying out the reservation service process of this invention and thereby forming a Computer Program Product 1200. The logic 1234 may be the same logic 1140 on memory 1104 loaded on processor 1103. The program logic may also be embodied in software modules, as modules, or as hardware modules.

The logic for carrying out the method may be embodied as part of the system described below, which is useful for carrying out a method described with reference to embodiments shown in, for example, FIG. 9 and FIG. 10. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data replication, the system comprising:
a production site including:
a first storage array with a first Logical Unit (LUN) and a first splitter;
a second storage array with a second LUN and a second splitter;
a consistency group; wherein the consistency group spans the first storage array and the second storage array by including the first LUN and the second LUN;
a replication site with a journal; and
computer-executable logic operating in memory, wherein the computer-executable program logic is configured for execution of:
splitting Input/Outputs (IOs) directed to the first LUN and the second LUN to the journal on the replication site;
creating a snapshot of the first LUN;
creating a snapshot of the second LUN; wherein the second snapshot is taken without ensuring the snapshot of the first LUN is consistent with the snapshot of the second LUN;
applying at least some of the IO in the journal on the replication site to a copy of the snapshot of the first LUN on the replication site and a copy of the snapshot of the second LUN on the replication site to create a first consistent snapshot of the first LUN and create a second consistent snapshot of the second LUN on the replication site;
wherein the first consistent snapshot and the second consistent snapshot are consistent with respect to the first array and the second array and at the same point in time, wherein the first and second consistent snapshot on the replication appliance are crash consistent snapshots captured at a consistent point in time;
wherein the splitting of the IO is stopped after the snapshots of the first LUN and the snapshot of the second LUN are created at the production site.

2. The system of claim 1 wherein the program logic is further configured for:
determining a first set of differences between the snapshot of the first LUN and a first old snapshot on the first array;
determining a second set of differences between the snapshot of the first LUN and a second old snapshot on the second array.

3. The system of claim 2 wherein the program logic is further configured for:
sending the snapshot of the first LUN as a first set of differences between the snapshot of the first LUN and the first old snapshot to the replication site; and
sending the snapshot of the second LUN as a second set of differences between the snapshot of the second LUN and the second old snapshot to the replication site.

4. The system of claim 3 wherein the program logic is further configured for:
applying the first set of differences to the copy of the snapshot of the first LUN on the replication site; and
applying the second set of differences to the copy of the snapshot of the first LUN on the replication site on the replication site.

5. A computer implemented method for taking snapshots in data replication comprising: splitting Input/Outputs (IOs) directed to a first Logical Unit (LUN) on a first storage array and a second LUN on a second storage array to a journal on a replication site; creating a snapshot of the first LUN; creating a snapshot of the second LUN; wherein the second snapshot is taken without ensuring the snapshot of the first LUN is consistent with the snapshot of the second LUN; applying at least some of the IO in the journal on the replication site to a copy of the snapshot of the first LUN on the replication site and a copy of the snapshot of the second LUN on the replication site to create a first consistent snapshot of the first LUN and create a second consistent snapshot of the second LUN on the replication site; wherein the first consistent snapshot and the second consistent snapshot are consistent with respect to the first array and the second array and at the same point in time, wherein the first and second consistent snapshot on the replication appliance are crash consistent snapshots captured at a consistent point in time, wherein the splitting of the IO is stopped after the snapshots of the first LUN and the snapshot of the second LUN are created at a production site.

6. The method of claim 5 further comprising:
determining a first set of differences between the snapshot of the first LUN and a first old snapshot on the first array;
determining a second set of differences between the snapshot of the first LUN and a second old snapshot on the second array.

7. The method of claim 6 further comprising
sending the snapshot of the first LUN as a first set of differences between the snapshot of the first LUN and the first old snapshot to the replication site; and
sending the snapshot of the second LUN as a second set of differences between the snapshot of the second LUN and the second old snapshot to the replication site.

8. The method of claim 7 further comprising:
applying the first set of differences to the copy of the snapshot of the first LUN first replication snapshot; and
applying the second set of differences to the copy of the snapshot of the second LUN second replication snapshot on the replication site.

9. A computer program product comprising: a non-transitory computer readable medium encoded with computer executable program, the code enabling: splitting Input/Outputs (IOs) directed to a first Logical Unit (LUN) on a first storage array and a second LUN on a second storage array to a journal on a replication site; creating a snapshot of the first LUN; sending a copy of the snapshot of the first LUN to the replication site; creating a snapshot of the second LUN; wherein the second snapshot is taken without ensuring the snapshot of the first LUN is consistent with the snapshot of the second LUN; sending a copy of the snapshot of the first LUN to the replication site; applying at least some of the IO in the journal on the replication site to a copy of the snapshot of the first LUN on the replication site and a copy of the snapshot of the second LUN on the replication site to create a first consistent snapshot of the first LUN and create a second consistent snapshot of the second LUN on the replication site; wherein the first consistent snapshot and the second consistent snapshot are consistent with respect to the first array and the second array and at the same point in time, wherein the first and second consistent snapshot on the replication appliance are crash consistent snapshots captured at a consistent point in time; and stopping the splitting after the snapshots of the first LUN and the snapshot of the second LUN are created at a production site.

10. The computer program product of claim 9 wherein code further enables:
  determining a first set of differences between the snapshot of the first LUN and a first old snapshot on the first array;
  determining a second set of differences between the snapshot of the first LUN and a second old snapshot on the second array.

11. The computer program product of claim 10 wherein code further enables:
  sending the snapshot of the first LUN as a first set of differences between the snapshot of the first LUN and the first old snapshot to the replication site; and
  sending the snapshot of the second LUN as a second set of differences between the snapshot of the second LUN and the second old snapshot to the replication site.

12. The computer program product of claim 11 wherein code further enables:
  applying the first set of differences to the copy of the snapshot of the first LUN first replication snapshot; and
  applying the second set of differences to the copy of the snapshot of the second LUN second replication snapshot on the replication site.

13. The computer program product of claim 9 wherein the split IO is sent to a data protection appliance; wherein the data protection appliance sends the split IO to the journal on the replication site.

14. The system of claim 1 wherein the split IO is sent to a data protection appliance; wherein the data protection appliance sends the split IO to the journal on the replication site.

15. The computer implemented method of claim 5 wherein the split IO is sent to a data protection appliance; wherein the data protection appliance sends the split IO to the journal on the replication site.

* * * * *